United States Patent [19]
Rosenband et al.

[11] Patent Number: 6,090,179
[45] Date of Patent: Jul. 18, 2000

[54] PROCESS FOR MANUFACTURING OF METALLIC POWER

[75] Inventors: Valory Rosenband; Charianna Sokolinsky, both of Haifa; Nikolay Efremenko, Yokoean Ilit; Dmitry Lekhtman, Nazareth Ilit, all of Israel

[73] Assignee: Remptech Ltd., Midgal Haemek, Israel

[21] Appl. No.: 09/124,772

[22] Filed: Jul. 30, 1998

[51] Int. Cl.[7] ................. B22F 9/18; B22F 9/20; B22F 9/22
[52] U.S. Cl. ................. 75/362; 75/364; 75/369; 75/373; 75/374
[58] Field of Search ................. 75/362, 364, 369, 75/373, 374

[56] References Cited

U.S. PATENT DOCUMENTS

| | | |
|---|---|---|
| 1,226,945 | 5/1917 | Burchenal . |
| 2,749,235 | 6/1956 | Roy . |
| 3,341,320 | 9/1967 | Smiley . |
| 3,353,933 | 11/1967 | Zdanuk et al. . |
| 3,480,426 | 11/1969 | Neuenschwander . |
| 3,630,718 | 12/1971 | Neuenschwander . |
| 4,093,450 | 6/1978 | Doyle et al. . |
| 4,178,172 | 12/1979 | Tiitinen et al. . |
| 4,397,682 | 8/1983 | Watanabe et al. . |
| 4,434,002 | 2/1984 | Watanabe et al. . |

*Primary Examiner*—George Wyszomierski
*Assistant Examiner*—Janelle Combs Morillo
*Attorney, Agent, or Firm*—Blank Rome Comisky & McCauley LLP

[57] ABSTRACT

A process for manufacturing of metal powder from a halogen containing chemical compound of the metal. The process involves thermal treatment of the compound within a closed reactor and in non-oxidizing atmosphere so as to induce decomposition of the compound and formation therefrom of a metal halide and a reduction agent capable to reduce the metal halide to elemental metal which can be collected in the form of fine powder. By variation of condition of the thermal treatment like temperature, pressure, duration and by choosing particular type of the compound it is possible to control the size and purity of the powder as well the powder particles shape.

16 Claims, 14 Drawing Sheets

PROCESS FOR MANUFACTURING OF METALLIC POWER

BACKGROUND OF THE INVENTION

The present invention relates to production of high purity extra fine and fine powders of transition metals such as Fe, Co, Ni, Cu, Zn, V, W, Mo, etc., which can be used for manufacturing of various articles by powder metallurgy technology or other technology involving shaping of a green product and its subsequent sintering. In the present invention the fine powder is the powder with particle size 10–45 micron and the extra fine powder is that one which has particle size 1–5 microns.

One of the requirements which the metal powder should meet is the uniformity of the powder size and its purity from oxygen and carbon. Conventionally metal powders satisfying these requirements have been prepared by various processes involving direct reduction of metal oxides within a stream of hydrogen at temperatures about 1100° C. The disadvantage of the processes based on direct reduction is associated with the necessity to prepare corresponding metal oxide for example from corresponding metal oxalate or carbonate. This procedure is complicated and energy consuming. Moreover, obtaining of metal oxides from carbonates or oxalates is associated with inclusion of carbon in the final powder, which might affect the properties of a product manufactured from such powder.

Some metal powders, such like Ni, Zn and Cu powders are prepared by hydro-metallurgical treatment of the appropriate raw material to prepare solution of the metal salt with subsequent electrolysis thereof. This technology also requires high consumption of electrical energy.

Some metal powders, such as Fe, Co, Ni, Cu, etc., can be obtained by the atomization process in which ingots of those metals are melted and sprayed. This process requires exceptionally high energy consumption and since it does not involve any chemical transformation the purity of the resulting powder can not be better then that of the starting material.

Fine powders of transition, metals can be produced by mechanical crushing of metal ingots within a stream of hydrogen or an inert gas. Unfortunately a great deal of mechanical energy is required to produce metal powder with particle size slightly less then 40 $\mu$m, while an extra-fine powder with particle size of 1 $\mu$m can not be manufactured at all by any mechanical means.

There is known also to use reducing of metal halides in a hydrogen plasma or $H_2/F_2$ flame for producing of extra-fine powders of V, W and Mo. Unfortunately this process is technologically complicated, requires dedicated machinery and is associated with high energy expenditures.

Fine powders of Cu, Ni and Co are produced by hydrogen reducing of aqueous solution of their ions, however this method requires high temperature and pressure and therefore can be carried out only within dedicated equipment having complicated construction.

Extra-fine metal powders can be produced by hydrogen reduction of metal fluorine containing compounds within the hydrogen stream. The shortcoming of this processes is associated with the necessity in an external means for establishing the hydrogen stream. Besides since the process is carried out within a stream and not within a stationary atmosphere there exists the possibility for contamination of the surrounding environment by harmful gaseous products formed during the reduction process.

Therefore it can be seen that despite the existence of various methods for manufacturing of metallic powder there is still felt a need for a new and improved method which will sufficiently reduce or overcome the above mentioned drawbacks of the prior methods.

OBJECTS OF THE INVENTION

The main object of the present invention is to provide a new, simple, efficient and inexpensive method of manufacturing of fine and extra fine metallic powder which does not require high consumption of energy or complicated equipment.

The further object of the present invention is to provide a method which does not require supply of hydrogen or any other reducing agent from external source.

Still further object of the invention is to provide a method of manufacturing of metal powder which can be carried out within a closed cycle and therefore will not be associated with polluting of the surrounding environment by harmful gaseous products.

Yet another object of the invention is to provide a method for manufacturing of metal powder having improved purity and controllable size.

SUMMARY OF THE INVENTION

In accordance with the present invention the above objects and advantages can be achieved in accordance with the following combination of its essential features, referring to different embodiments of the invention.

The first embodiments of the present invention refers to a process for manufacturing of a metal powder from a halogen containing chemical compound of said metal, the process comprising:

decomposition of said chemical compound, said decomposition accompanied by formation of a metal halide and of a reducing agent capable to reduce said metal halide to elemental metal, reducing said metal halide by said reducing agent to elemental metal and collecting said elemental metal in the form of powder.

According to the other embodiment said metal is selected from groups IVb, Vb, VIb, VIIb, VIII, IIb of the Periodic Table.

In the further embodiment said halogen containing compound comprises nitrogen and hydrogen.

As per still further embodiment said halogen containing compound comprises metal ammonium halide, metal amine halide or metal hydrazine halide.

In yet another embodiment said reducing agent is hydrogen.

In the further embodiment said decomposition is induced by thermal treatment of said compound, said thermal treatment carried out at a temperature which is not lower than the temperature at which reducing of said metal halide by said agent to elemental metal is of thermodynamic equilibrium.

According to the other preferred embodiment said thermal treatment is carried out in a stationary, initially non-oxidizing atmosphere.

In a further embodiment said metal is Co, Ni or Cu and said chemical compound is metal ammonium fluoride, metal amine chloride or metal hydrazine chloride.

In yet another embodiment said thermal treatment is carried in a closed reactor.

As per other embodiment the process comprises applying vibration to said reactor.

According to the further embodiment the process comprises cooling of said powder before it is collected.

According to the other embodiment said cooling is carried out in a stationary, initially non-oxidizing atmosphere.

As per still further embodiment said chemical compound is $(NH_4)_2CoF_4$ and said thermal treatment is carried out in the stationary atmosphere of nitrogen at temperature 550–750° C. under pressure of not more than 5 atm.

In accordance with the other embodiment said chemical compound is $(NH_4)CoF_3$ and said thermal treatment is carried out in the stationary atmosphere of nitrogen at 600–750° C. under pressure of not more than 5 atm.

In yet further embodiment said chemical compound is $[Co(NH_3)(_6Cl]Cl_2$ and said thermal treatment is carried out in the stationary atmosphere of nitrogen at 550–750° C. under pressure of not more than 7 atm.

In yet another preferred embodiment said chemical compound is $(NH_4)_2NiF_4$ and said thermal treatment is carried out in the stationary atmosphere of nitrogen at 370–550° C. under pressure of not more than 5 atm.

As per further preferred embodiment said chemical compound is $(NH_4)_2CuF_4$ and said thermal treatment is carried out in the stationery atmosphere of nitrogen at 270–400° C. under pressure of not more than 2 atm.

The present invention defined as above provides a method for producing of high-purity extra-fine and fine metal powders of transition metals such as Fe, Co, Ni, Cu, Zn, V, W, Mo, etc. The process involves thermal decomposition of ammonium or amine halogen compounds of above metals within a closed reactor and in stationary, initially non-oxidizing atmosphere. The decomposition is accompanied by formation of metal halides and free hydrogen, which reduces those halides to powdered elemental metal. Since the hydrogen required for reduction of metal halides is constituent of said metal compounds, it is formed in situ and therefore there is no need for external source therefor. By virtue of this provision the process is simple and inexpensive since it can be carried out at relatively low temperatures and pressures within non complicated equipment and without high consumption of energy.

For a better understanding of the present invention as well of its benefits and advantages, reference will now be made to the following description of its various embodiments taken in combination with the accompanying drawings.

DETAILED DESCRIPTION OF SPECIFIC EMBODIMENTS

Figure 1:
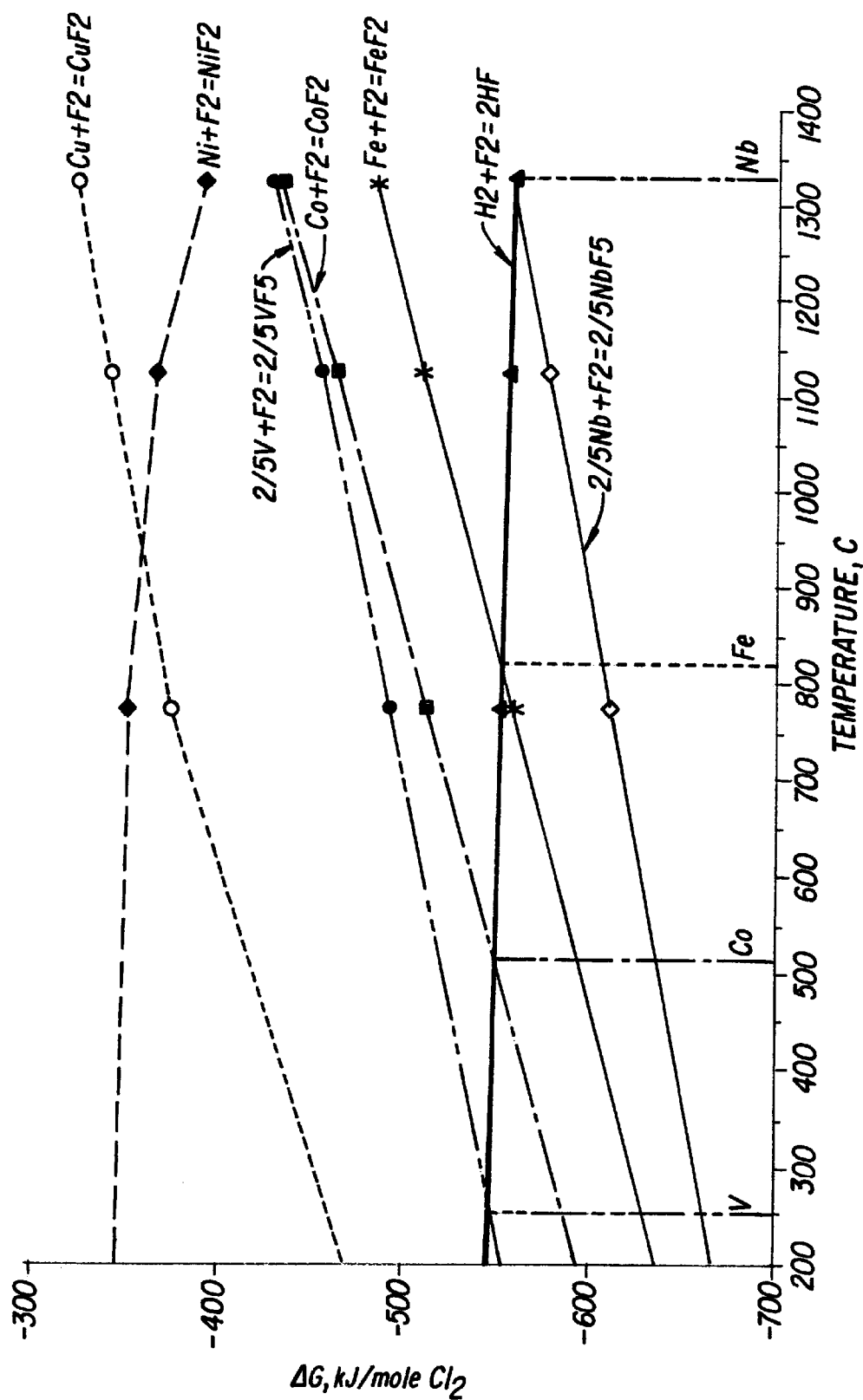
FIGS. 1,2 are graphs showing temperature dependence of free energy formation of metal fluoride and metal chloride respectively, at normal pressure.

It has been empirically revealed that high purity, oxygen- and carbon-free, extra-fine or fine non-agglomerated powder of transition metals such as Fe, Co, Ni, Cu, V, Zn, W, Mo, etc., can be manufactured by thermal decomposition of ammonium or amine halide compounds of the above metals accompanied by formation of corresponding metal halides and hydrogen. In the further description by transition metals are substantially meant those metals which refer to groups IVb, Vb, VIb, VIIb, VIIIb, Ib, and IIb of the Periodic Table. The halides of those metals are reduced to elemental metals by hydrogen formed during decomposition induced by thermal treatment. The process of thermal treatment is carried out in a closed reactor and in stationary non-oxidizing atmosphere, while hydrogen which is necessary for reduction is formed in situ from said ammonium or amine halide compounds. An example of thermal decomposition of said compounds with subsequent formation of elemental metal will be illustrated below for cobalt ammonium fluoride $NH_4CoF_3$.

After heating up to the temperature of at least 370° C. the above compound decomposes to cobalt fluoride as follows:

$$NH_4CoF_3 \leftrightarrow CoF_2+NH_3+HF$$

At the same temperature the decomposition of ammonia takes place with formation of free hydrogen:

$$NH_3 \leftrightarrow 1/2N_2+3/2N_2$$

At the temperature of at least 520° C. hydrogen reduces cobalt fluoride to metal cobalt:

$$CoF_2+_2 \leftrightarrow Co+2HF$$

The elemental cobalt metal forms within the reactor and can be collected therefrom after cooling.

In the further description the temperatures at which reduction of corresponding halide occurs will be referred to as critical temperatures.

It has been empirically discovered that it is advantageous if recycling of the gaseous products formed during the process is arranged and it is accompanied by deposition of corresponding ammonium halide in the cool part of the reactor.

For example at the temperature less than 170° C. the deposition of $NH_4F$ occurs at 1 atm according to equation:

$$1/6N_2+1/2H_2+1/3HF \leftrightarrow NH_4F$$

The above reaction refers to recycling of nitrogen and HF formed during the thermal decomposition and it has been observed that it is favorable since it reduces the pressure within the reactor and critical temperatures.

It can be readily appreciated that reducing of pressure and temperature is associated with lowering the energy consumption and thus renders the process inexpensive. The resulting equation of reduction of cobalt metal from its ammonium fluoride compound can be expressed as:

$$NH_4CoF_3 \leftrightarrow Co+1/3NH_4F+8/3HF+1/3N_2 \qquad (1)$$

An additional example of thermal decomposition of a halide containing compound with subsequent formation of elemental metal will be illustrated below for cobalt hexaamine chloride $Co(NH_3)_6Cl_3$.

At the temperature above 350° C. this compound decomposes as follows:

$$Co(NH_3)_6Cl_3 \leftrightarrow CoCl_2+HCl+17/3NH_3+1/6N_2$$

At the same temperature the ammonia decomposes with formation of free hydrogen according to the following equation:

$$17/3NH_3 \leftrightarrow 17/6N_2+17/2H_2$$

At the temperatures above the critical temperature $T°=630°$ C. the hydrogen formed during decomposition of ammonia reduces cobalt chloride to metal cobalt according to the following equation:

$$CoCl_2+H_2 \leftrightarrow Co+2HCl$$

At temperatures lower than 270° C. occurs deposition of $NH_4Cl$ in the cold part of the reactor according to equation:

$$3HCl+3/2N_2+9/2H_2 \leftrightarrow 3NH_4$$

The resulting equation of reduction of Co from its hexaamine chloride is:

$$Co[(NH3)_6Cl]Cl_2 \leftrightarrow Co+3NH_4Cl+2NH_3+1/2N_2$$

The same equations can be also written for other metal ammonium or amine halide compounds, as expressed by the following equations (2) to (9):

$$(NH_4)_2CoF_4 \leftrightarrow Co+4/3NH_4F+8/3HF+1/3N_2 \quad (2)$$

$$(NH_4)_2NiF_4 \leftrightarrow Ni+4/3NH_4F+8/3HF+1/3N_2 \quad (3)$$

$$NH_4FeF_2 \leftrightarrow Fe+1/3NH_4F+8/3HF+1/3N_2 \quad (4)$$

$$(NH_4)_3VF_6 \leftrightarrow V+2NH_3+6HF+1/2N_2 \quad (5)$$

$$(NH_4)_2WO_2F_4 \leftrightarrow W+2H_2O+4HF+N_2 \quad (6)$$

$$(NH_4)_2MoO_2F_4 \leftrightarrow Mo+2H_2O+4HF+N_2 \quad (7)$$

$$(NH_4)_2CuF_4 \leftrightarrow Cu+4/3NH_4F+8/3HF+1/3N_2 \quad (8)$$

$$NH_4ZnF_3 \leftrightarrow Zn+1/3NH_4F+8/3HF+1/31 N_2 \quad (9)$$

It has been empirically found that there exist other ammonium or amine halide compounds of transition metals which also can be successfully reduced to elemental metal sin the form of fine powder.

Besides of ammonium or amine halide compounds there exist as well other hydrogen/halide containing compounds of transition metals, capable to undergo thermal decomposition with subsequent reduction to elemental metal by the hydrogen formed in situ during the decomposition. An example of such compound is metal hydrazine chloride and its reduction to elemental cobalt or nickel can be expressed by the following equations:

$$Co(N_2H_4)_2Cl_2 = Co+2NH_4Cl+N_2$$

$$Ni(N_2H_4)_2Cl_2 = Ni+2NH_4Cl+N_2$$

Figure 2:
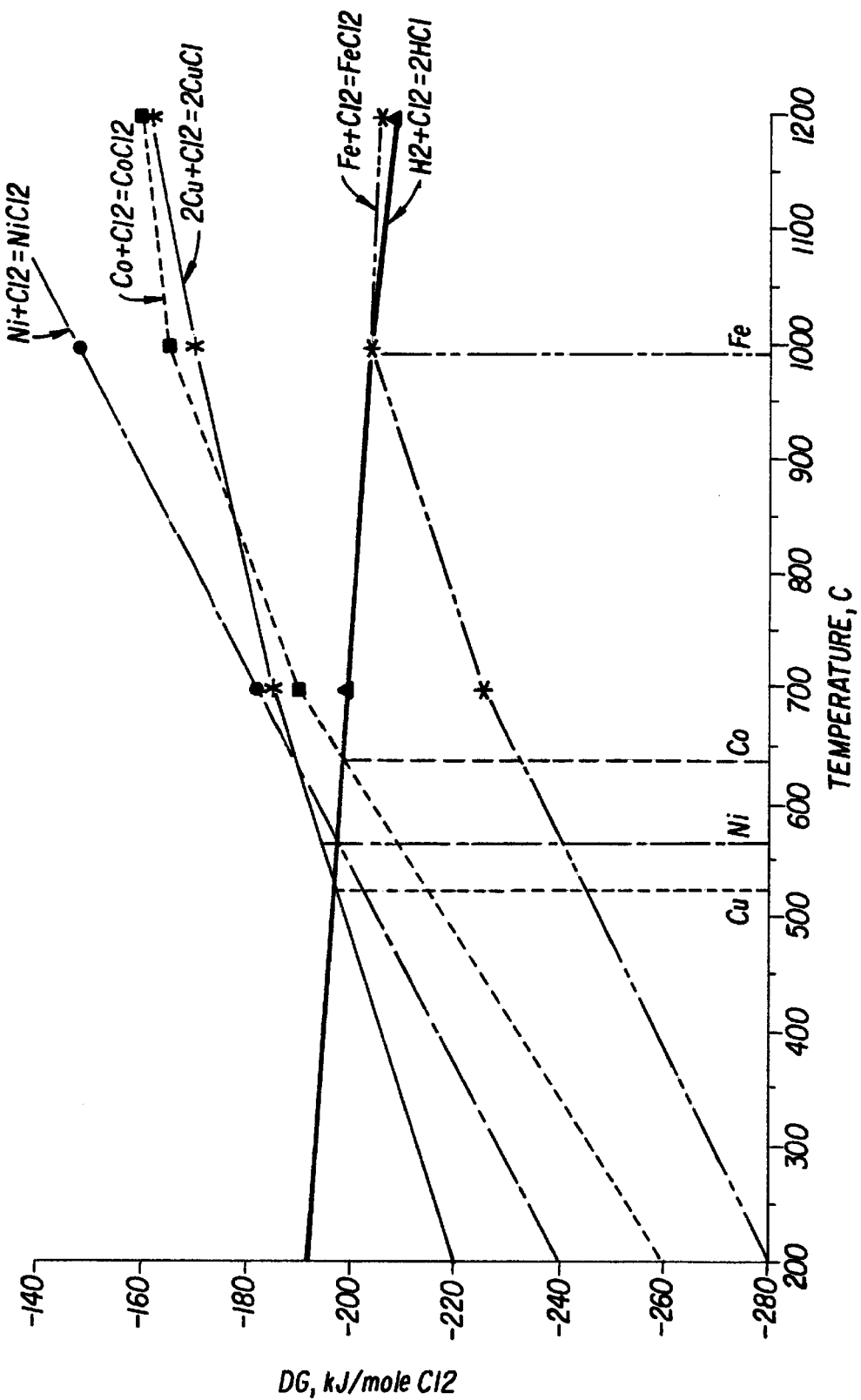

Now with reference to FIGS. 1,2 it is shown the temperature dependence of the thermodynamic potential of formation of fluorides and chlorides of some above mentioned metals and the thermodynamic potential of formation of HCl and HF. These dependencies can be taken for example from a book by Terkee Rosenqvist Principles of Extractive Metallurgy, McGraw-Hill, N.Y., 1986. These dependencies refer to equilibrium conditions and are relevant to the present manufacturing process since they enable estimation of the initial critical temperature required therefor. The dependencies are taken for the pressure of 1 atmosphere and they can be used for estimation the critical temperatures T°, above which reduction by hydrogen is thermodynamically possible and therefore thermal decomposition of the appropriate ammonium or amine halide compound will be followed by formation of elemental metal. In particular, in FIG. 1 it can be seen that V, Co, Fe and Nb fluorides require certain minimum temperature for their reduction to respective metals, while for Cu and Ni fluorides there is no such thermodynamic limitation.

In accordance with the invention the process of thermal decomposition is carried out in a closed reactor in stationary, initially non-oxidation gaseous atmosphere. As such atmosphere one can use nitrogen, hydrogen, inert gases or their mixtures. The reactor is fed with a raw material which is a halide containing chemical compound of a transition metal, for example compound of Co. This compound can be prepared for instance by transforming a feed stock of primary or secondary source of cobalt. For this purpose cobalt containing sludge is leached and then is purified by hydrolytic purification and by extraction purification to 99.8% purity.

Figure 4:
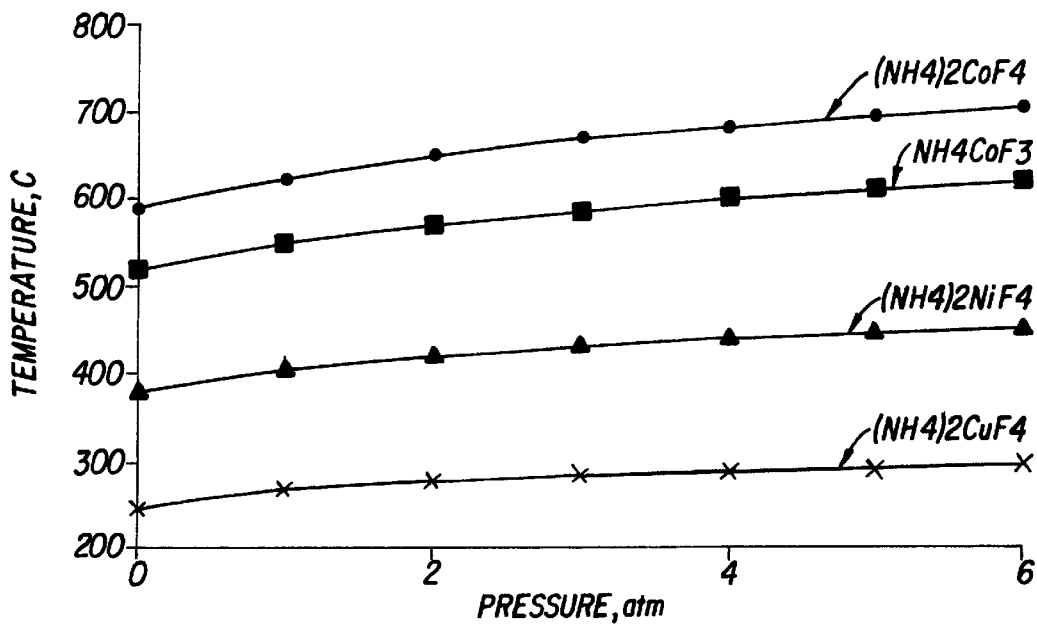
FIGS. 4,5 are graphs showing equilibrium temperature-pressure dependence corresponding to formation of metal fluoride and metal chloride respectively.
Figure 5:
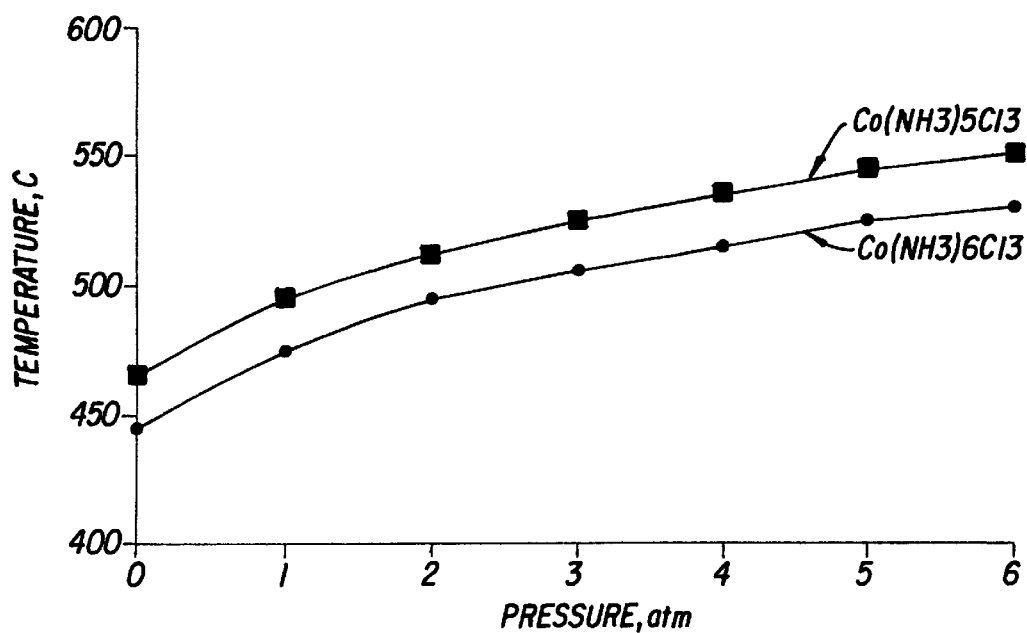

After the initial process parameters corresponding to 1 atmosphere pressure have been defined the pressure-temperature dependence should be taken into consideration so as to establish those condition which are relevant to the decomposition process carried out in a closed reactor. With reference to FIGS. 4,5 one can see such dependencies established for various chemical compounds, suitable for use in the present invention.

The reactor communicates with a cooling receiver section in which condensation of gaseous products of the decomposition takes place at the low temperature zone. By virtue of this provision it is possible to reduce the pressure and temperatures in the reactor and thus to establish both favorable and safe conditions for conducting the manufacturing process.

To initiate the decomposition the reactor can either be placed within a heated up furnace or the furnace can be heated up together with reactor. The necessary ratio between the pressure developing during the decomposition and the working temperature required for complete reduction of the metal is estimated on the basis of above mentioned thermodynamic dependencies and then adjusted empirically. It has been found that by proper adjustment of the process parameters, such as temperature, pressure, duration and type of the chemical compound it is possible not only to receive fine or extra fine metallic powder but also to control powder particle size and morphology thereof.

After completing the decomposition stage the powder is formed in the reactor and can be collected therefrom. It is advantageous to carry out the cooling stage within a fresh non-oxidizing atmosphere so as to prevent the possibility of the reverse reaction of formation of metal halides. For this purpose the reactor is evacuated and then refilled with a new portion of non-oxidizing gas.

It has been found that during the process the powder is purified from such impurities like Al, Si or Ti, since they form volatile halides, which can be removed from the reactor.

Figure 3:
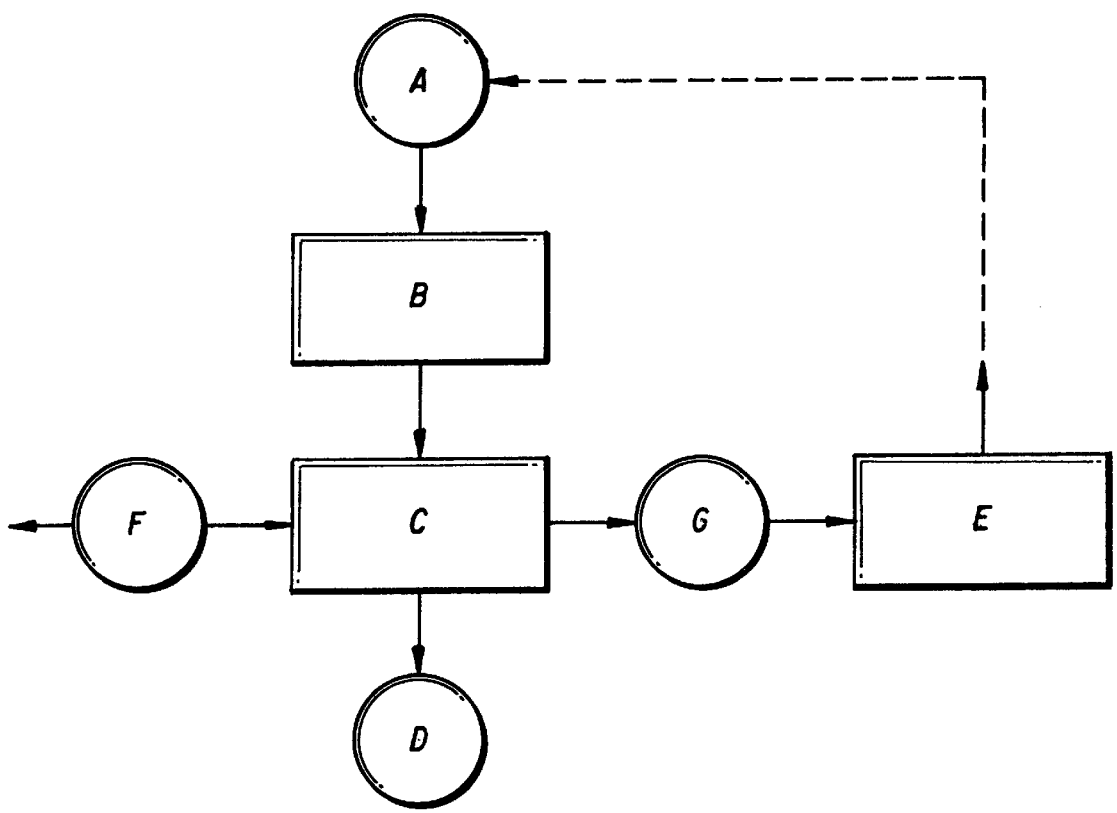
FIG. 3 shows schematically the flow chart diagram of the method.

As best seen in FIG. 3 the initial chemical compound (A), like ammonium or amine halide compound of transition metals such as Fe, Co, Ni, Cu, Zn, V, W, Mo, etc. undergoes thermal decomposition (B) within a closed reactor in stationary non-oxidizing atmosphere. The particular decomposition temperature depends on the kind of the compound, nevertheless the reduction of any transition metal in accordance with the present invention occurs at lower temperature than the temperature required for reduction of the same metal from its oxide. The reduction of metal is effected by the hydrogen which is formed in situ from the compound itself. After decomposition the cooling stage (C) takes place and the end product in the form of extra-fine or fine metal powder (D) is collected. The gaseous by-products (G) of the thermal decomposition process include ammonium halides and halogen acids such as $NH_4F$, $NH_4Cl$, HF, HCl, etc. These by-products are removed from the reactor to the recycling stage (E) and then recovered. The only gaseous by-product, which is not recovered during the process is nitrogen. This by-product is discharged to atmosphere (F), however it is not harmful for the environment.

The following advantages are associated with the present invention:

1. Oxygen- and carbon-free, extra-fine and fine, non-flammable metal powders exhibiting high corrosion resistant in the air at room temperature can be produced efficiently by simple and non-expensive process;
2. Since the powder manufacturing process is carried out in closed reactor it is not associated with polluting the environment by harmful gaseous or other wastes;
3. The dedicated hydrogen producing station is not required, since hydrogen is formed in situ from the halide compounds during their thermal decomposition;
4. The process does not require power consuming and complicated equipment and therefore a plant for carrying out the process can be located anywhere close to the source of raw materials or to the market;
5. The process is inexpensive;
6. The process enables control of powder size, morphology and purity of the powder;

Now the present invitation will be illustrated below by way of following non limiting examples.

EXAMPLE 1

Figure 6:
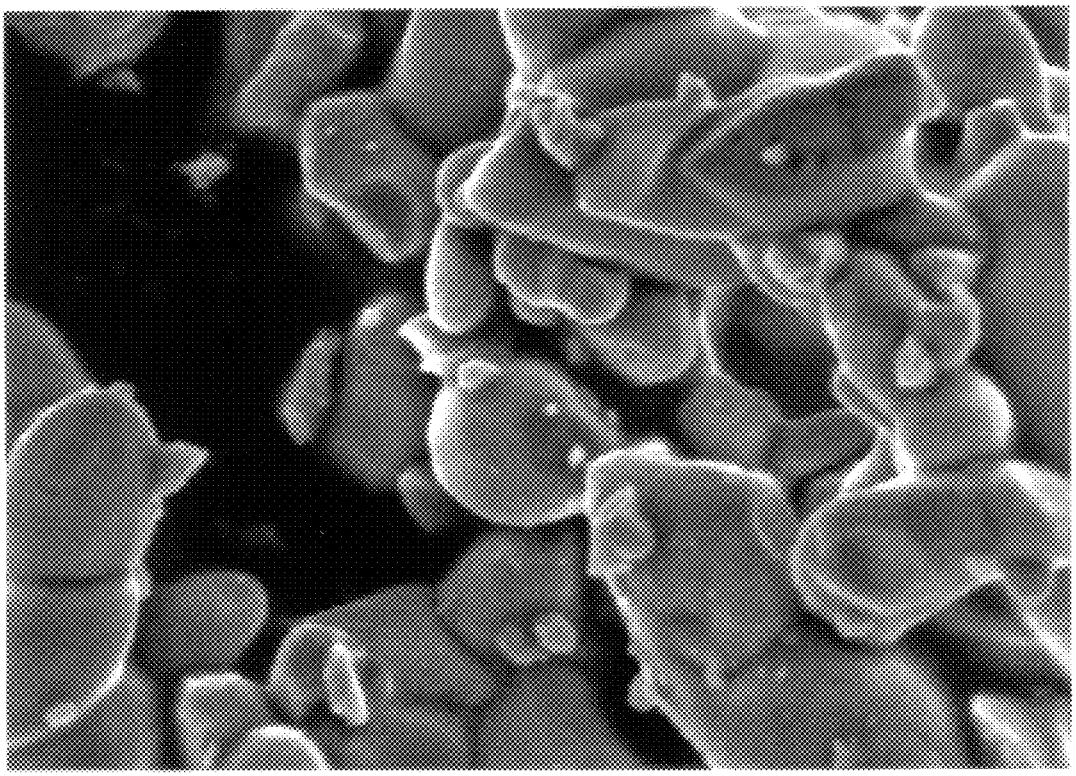
FIGS. 6,7,8,9,10,11a,11b, 11c, 12a, 12b are SEM micrographs showing powder particles of metallic powders manufactured in accordance with different embodiments of the present invention.

Double fluorides of Co with ammonium $(NH_4)_2CoF_4$ were heated in nitrogen in a closed reactor provided with cooling receiver section. The pressure during the process was kept below 5 atm, preferably about 2 atm. The critical temperature $T°$ above which thermal decomposition of said compound should be carried out was established with the aim of FIG. 4. The working temperatures were 550–750° C., being preferably about 620° C. The total time of the manufacturing process was about 2 hours. After completing the decomposition stage the reactor was evacuated and filled with fresh nitrogen to prevent reversible reactions during the cooling stage. The resulting powder was investigated by Ionization Combustion Plasma method (ICP), by scanning electron microscopy (SEM), energy disperse X-Ray analysis and by X-Ray diffraction. Detailed description of the above methods can be found for example in a book Modern Physical Techniques in Materials Technology, edited by T. Mulvey and R. K. Websted, Oxford University Press, 1974. The above methods confirmed the crystalline structure of the obtained metal powder. The particles shape is presented in FIG. 6. The particle size was 1–2 $\mu$m. The purity of the powder was 99.8%. The content of Fe and Si was determined by energy disperse analysis and was found 0.1% for each element.

EXAMPLE 2

Figure 7:
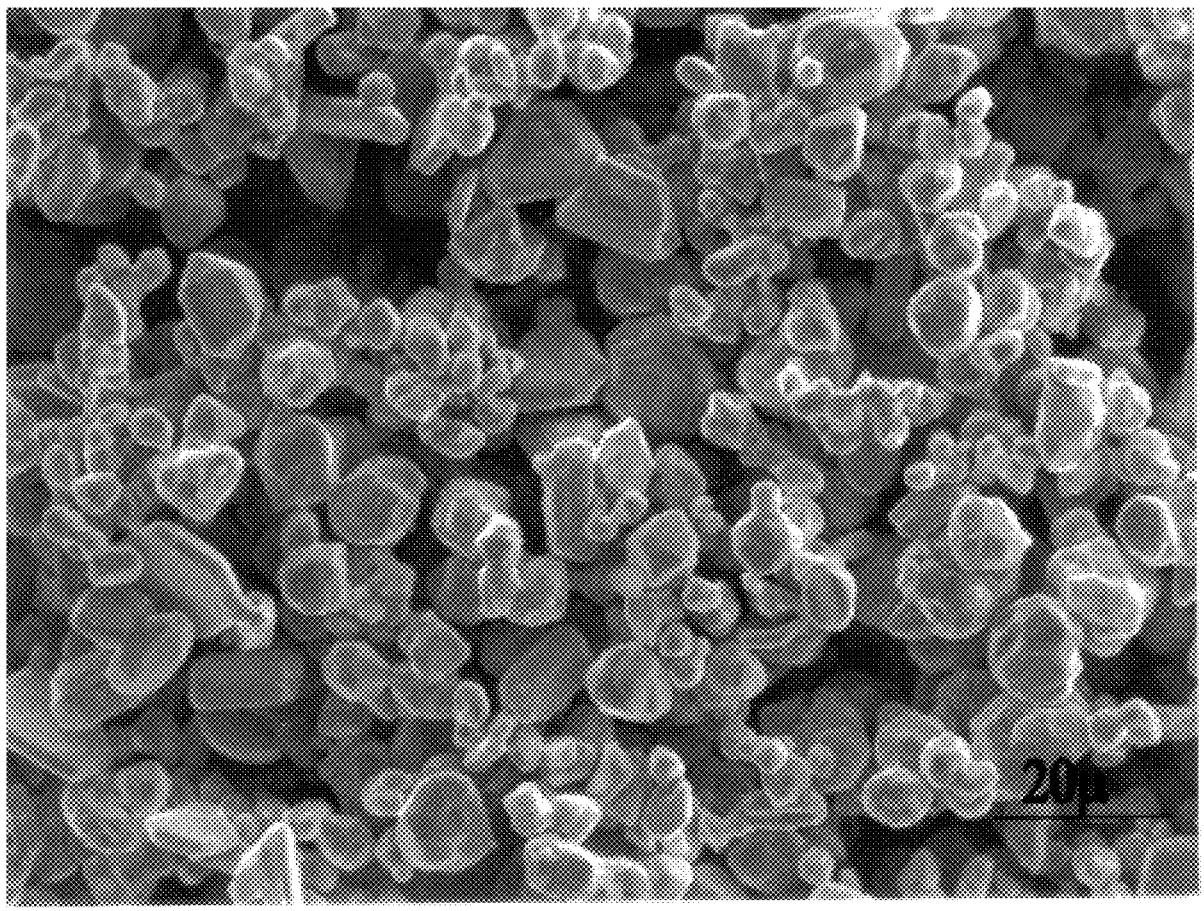

Cobalt ammonium fluoride $NH_4CoF_3$ was heated in nitrogen in a closed reactor provided with cooling receiver section. The pressure during process was kept about 5 atm. The critical temperature $T°$ above which the process of thermal decomposition of said compound have to be carried out was established with the aim of FIG. 4. The working temperatures were 600–750° C., being preferably about 710° C. The total process time was about 2 hours. After completing the decomposition stage the reactor was evacuated and filled with fresh nitrogen to prevent reversible reactions during the cooling stage. The resulting powder was investigated by Ionization Combustion Plasma method (ICP), by scanning electron microscopy (SEM), energy-disperse X-Ray analysis and by X-Ray diffraction. The above methods confirmed the crystalline structure of the obtained metal powder. The powder particles shape is presented in FIG. 7. The particle size was 5–10 $\mu$m. The purity of the powder was 99.8%.

EXAMPLE 3

Figure 8:
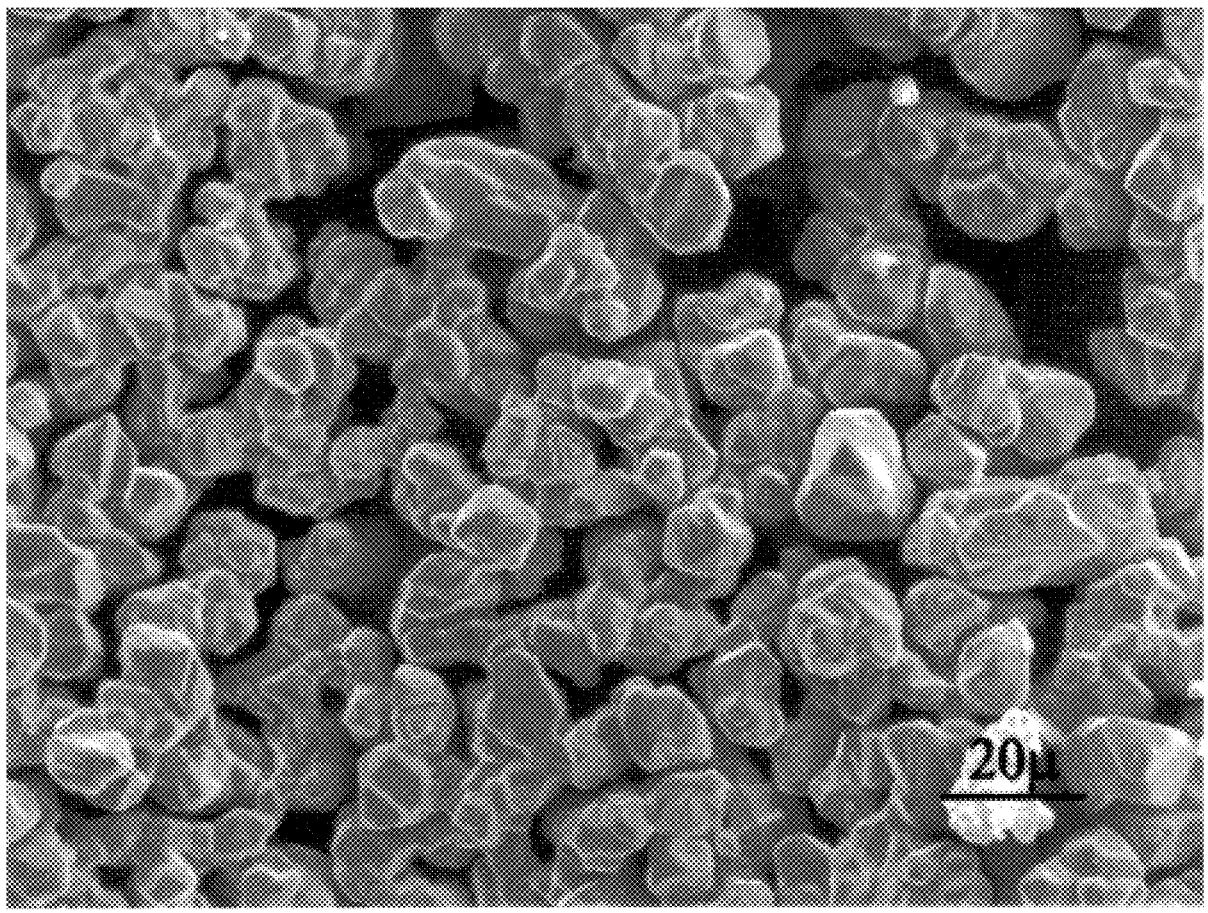

Hexa-amine cobalt trichloride $[Co(NH_3)_6Cl]Cl_2$ was thermally decomposed in nitrogen in a closed reactor provided with cooling receiving section. The working pressure during the process was kept about 7 atm. The critical temperature $T°$ above which the process of thermal decomposition of said compound can be carried out was established with the aim of FIG. 5. The working temperatures were 600–750° C., being preferably about 670° C. The total process time was about 2 hours. After completing the decomposition stage the reactor was evacuated and filled with fresh nitrogen to prevent reversible reactions during the cooling stage. The resulting powder was investigated by Ionization Combustion Plasma method (ICP), by scanning electron microscopy (SEM), energy-disperse X-Ray analysis and by X-Ray diffraction. The above methods confirmed the crystalline structure of the obtained metal powder. The powder particles shape is presented in FIG. 8. The particle size was 10–20 $\mu$m. The spectrographic analysis of resulting Co powder is presented below.

| Element | Content in % |
| --- | --- |
| Al | <0.01 |
| Ca | 0.02 |
| Cu | 0.04 |
| Na | <0.01 |
| Si | <0.01 |
| Fe | <0.01 |
| Ni | 0.03 |
| Mg | <0.01 |
| Total | <0.14 |

The carbon content was determined by chromatographic analysis and was found below the accuracy of the method (0.03%). The oxygen content was determined by energy disperse X-Ray analysis after two month storage in open air and was found below the accuracy of the method, which indicates on good corrosion resistance of the powder.

EXAMPLE 4

Figure 9:
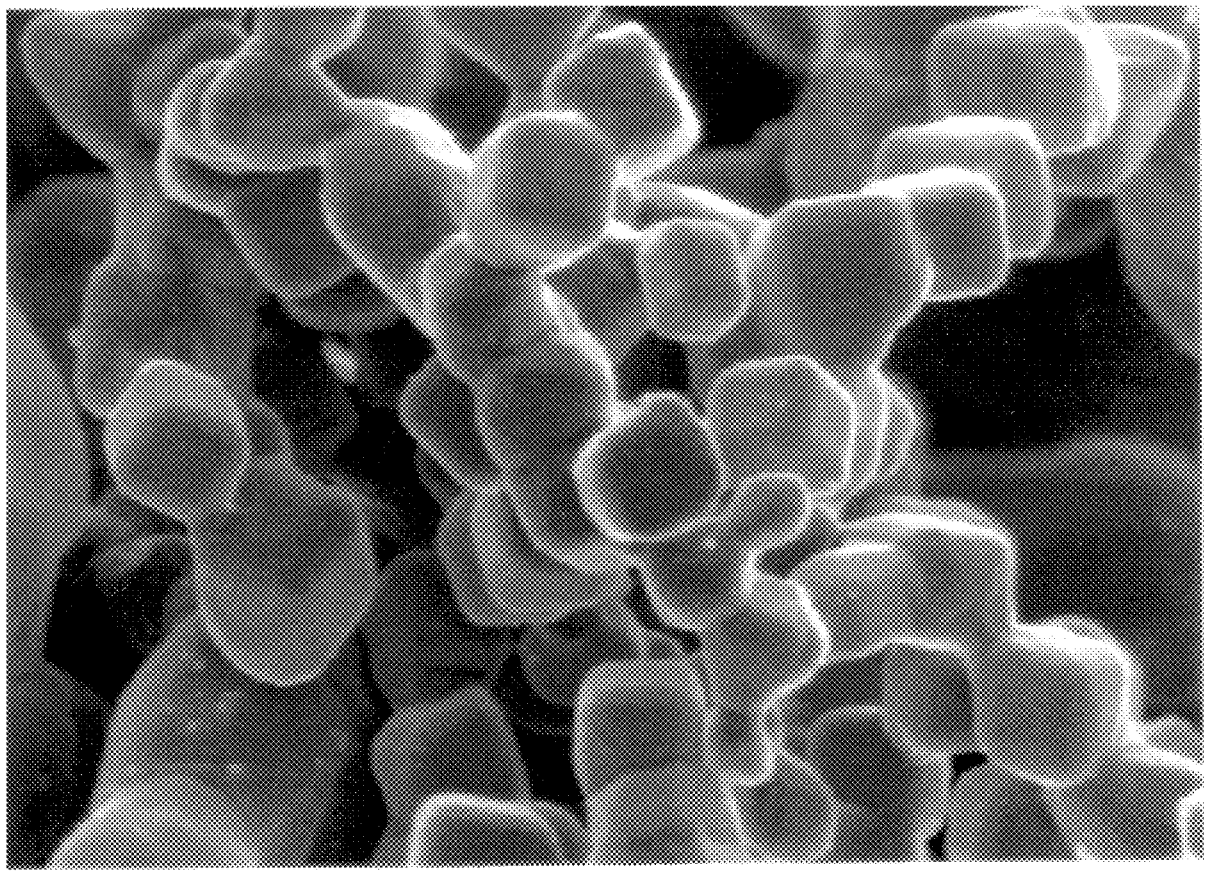

Double fluorides of Ni with ammonium $(NH_4)_2NiF_4$ were heated in nitrogen in a closed reactor provided with cooling receiver section. The pressure during the process was kept below 5 atm, preferably about 2 atm. The critical temperature $T°$ above which thermal decomposition of said compound can be carried out was established with the aim of FIG. 4. The working temperatures were 370–550° C., being preferably about 540° C. The total time of the manufacturing process was about 1.2 hours. After completing the decomposition stage the reactor was evacuated and filled with fresh nitrogen to prevent reversible reactions during the cooling stage. The resulting powder was investigated by Ionization Combustion Plasma method (ICP), by scanning electron microscopy (SEM), energy disperse X-ray analysis and by X-ray diffraction. The above methods confirmed crystalline structure of the obtained powder. The particles shape is presented in FIG. 9. The particle size was about 1 $\mu$m. The purity of the powder was 99.8%.

EXAMPLE 5

Figure 10:
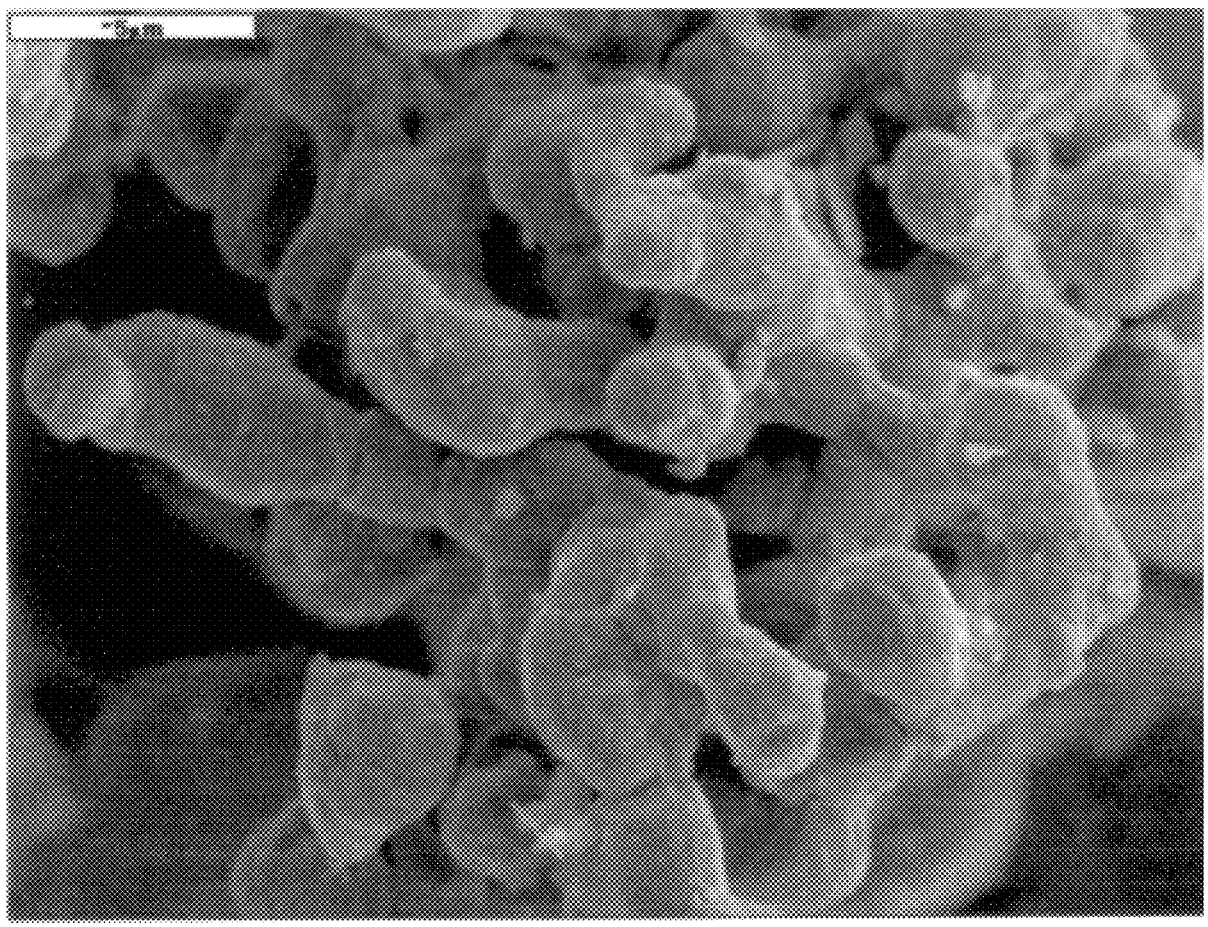

Double fluoride of copper with ammonium was heated in stationary atmosphere of nitrogen within a closed reactor placed in a furnace. The pressure during the process was kept about 2 atm. The critical temperature T° above which thermal decomposition of said compound can be carried out was established with the aim of FIG. 4. The working temperatures were 270–400° C., being preferably about 350° C. The total time of the manufacturing process was about 1.5 hours. After completing the decomposition stage the reactor was evacuated and filled with fresh nitrogen to prevent reversible reactions during the cooling stage. The resulting powder was investigated by Ionization Combustion Plasma method (ICP), by scanning electron microscopy (SEM), energy disperse X-Ray analysis and by X-Ray diffraction. The above methods confirmed crystalline structure of the obtained powder. The particles shape is presented in FIG. 10. The particle size was about 2–3 $\mu$m. The purity of the powder was 99.8%.

Figure 11A:
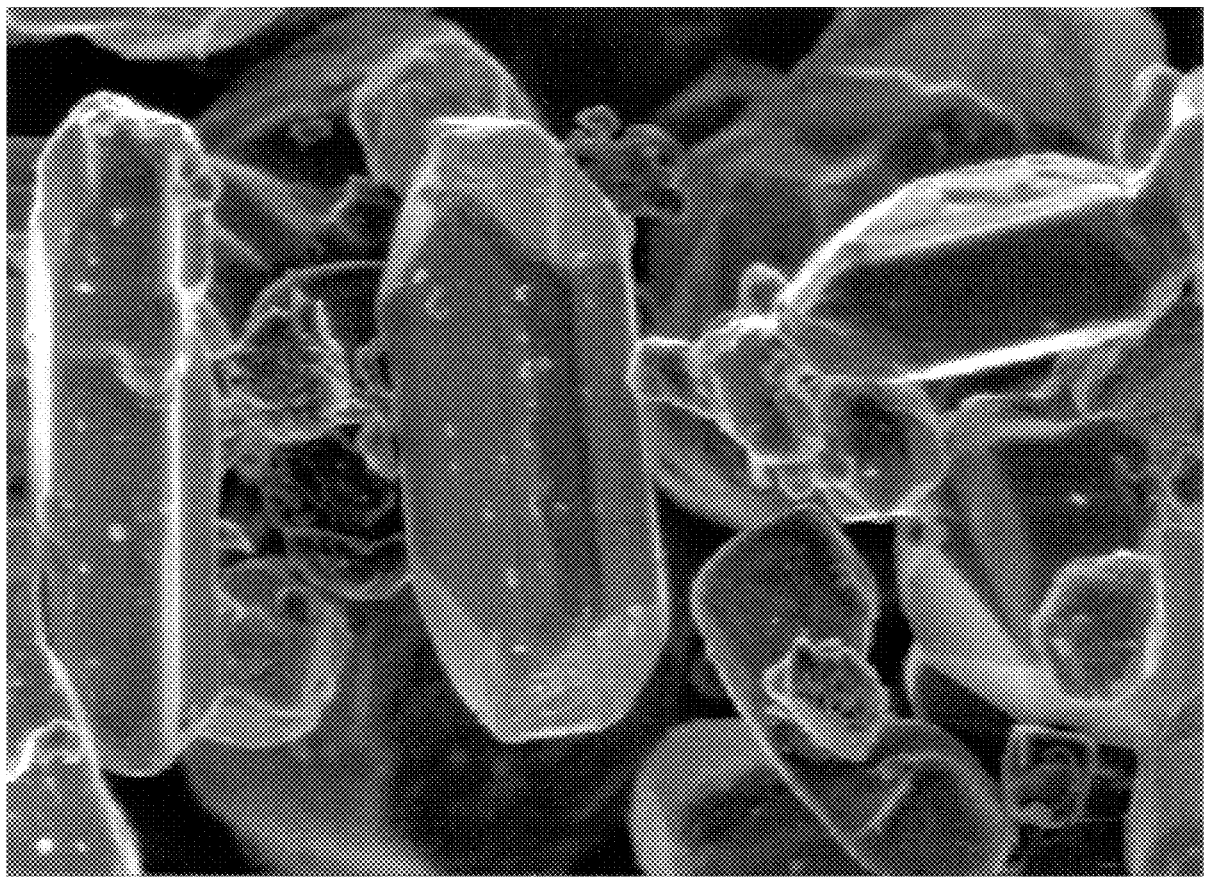
Figure 11B:
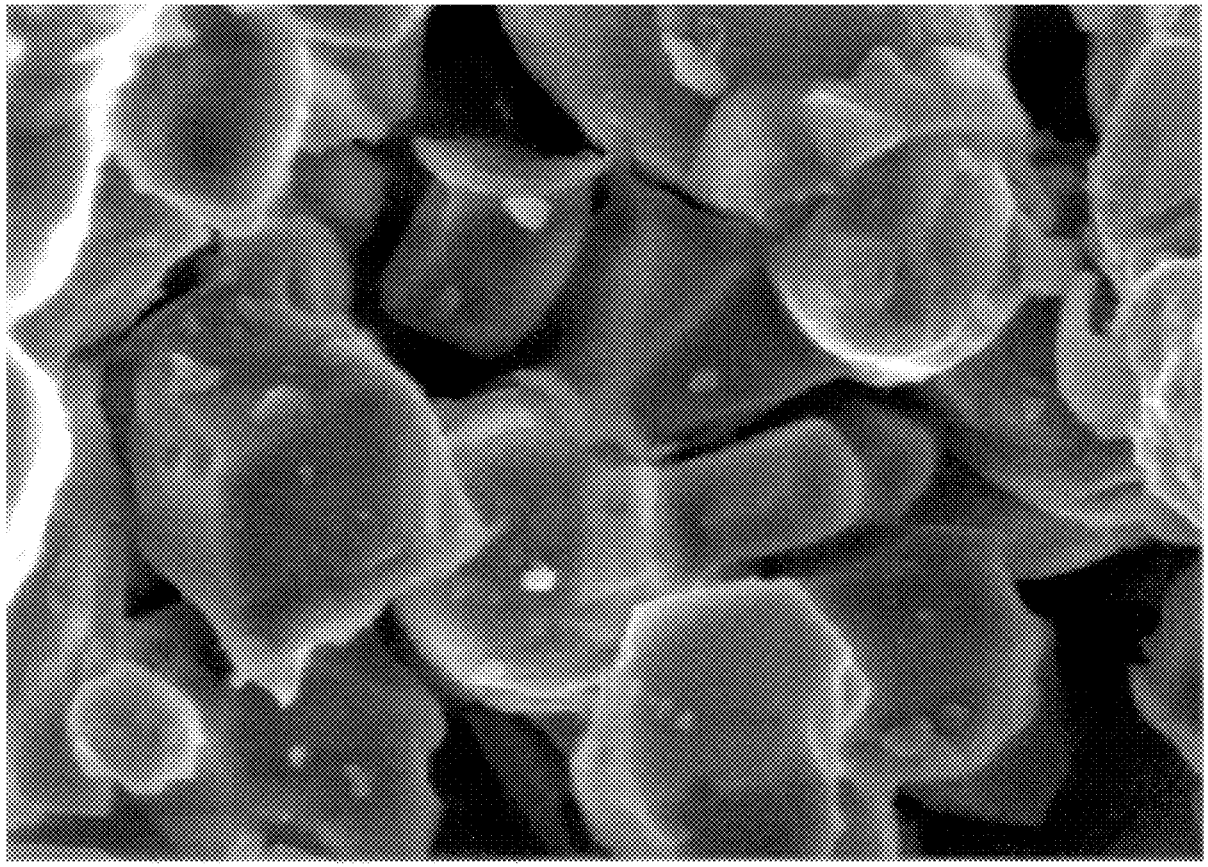
Figure 11C:
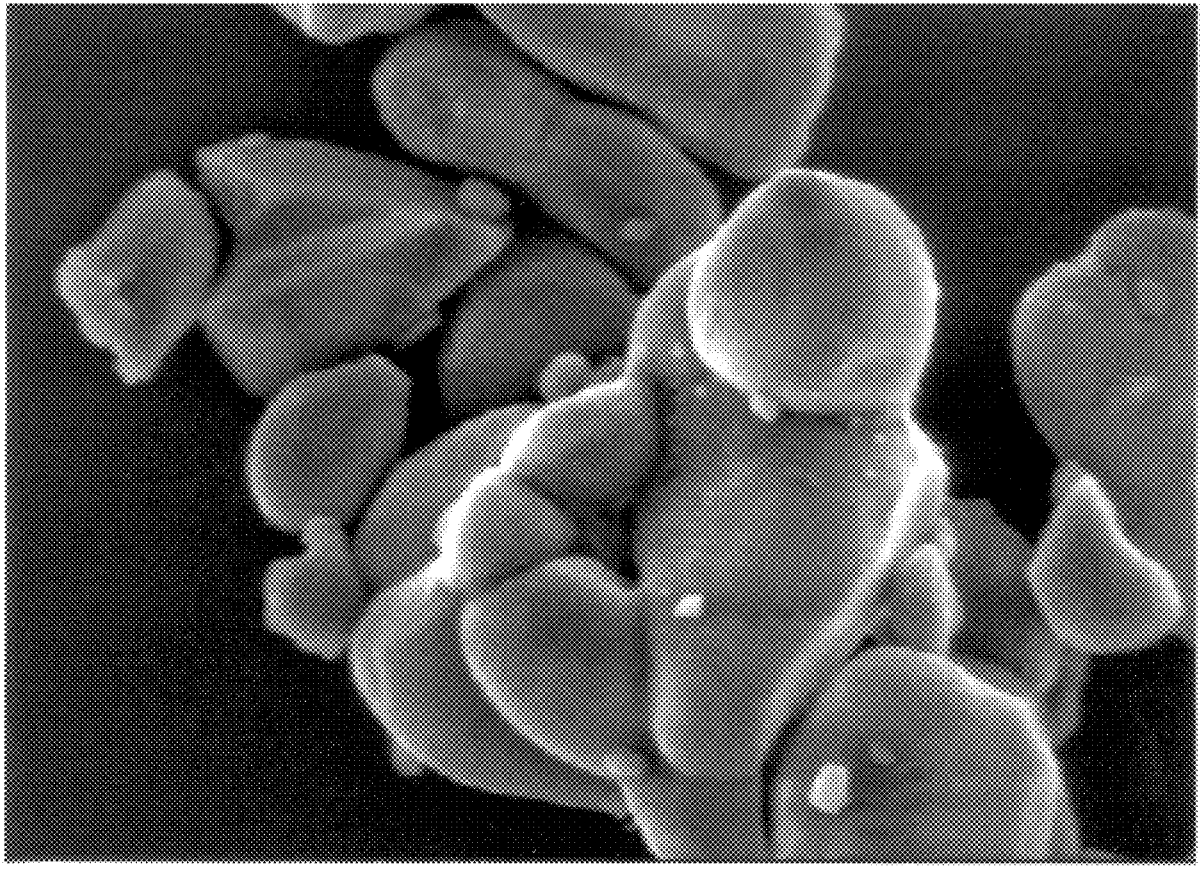
Figure 12A:
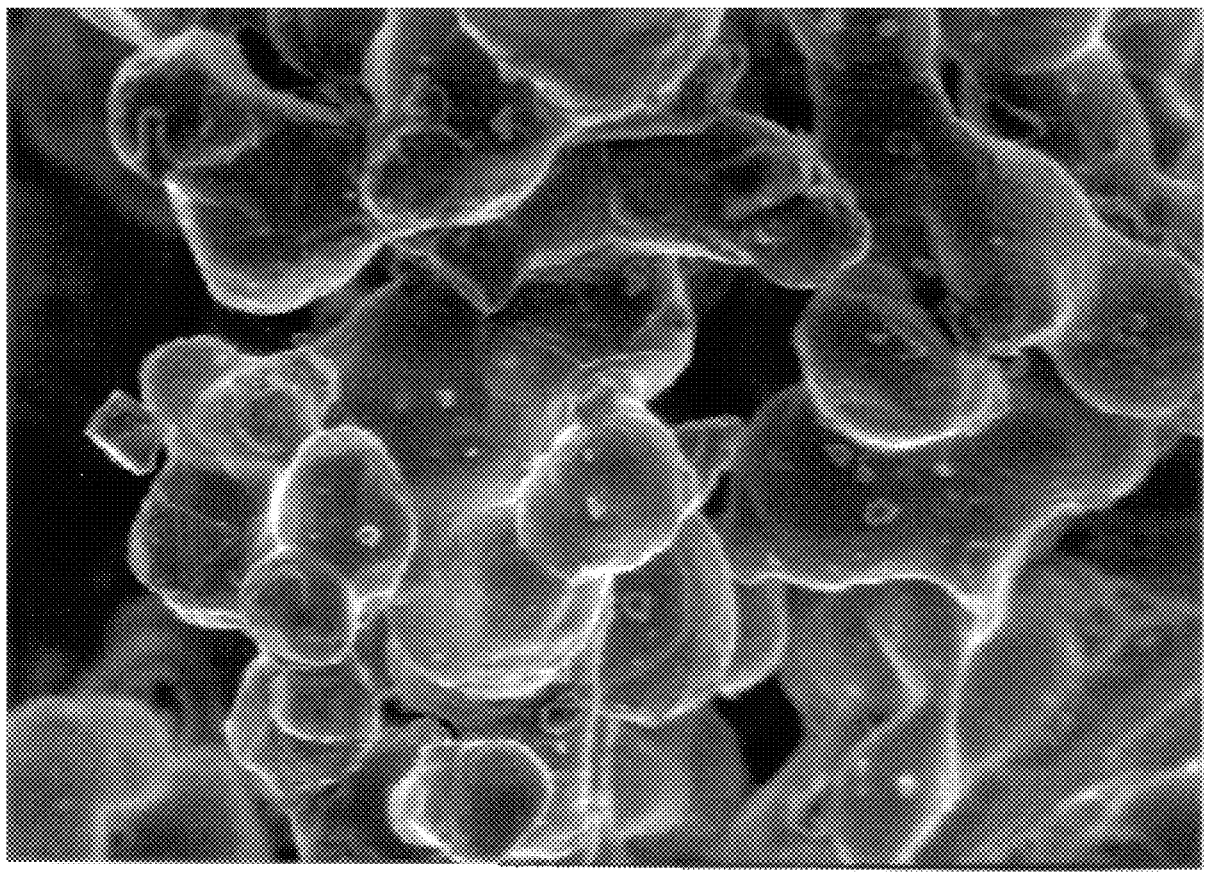
Figure 12B:
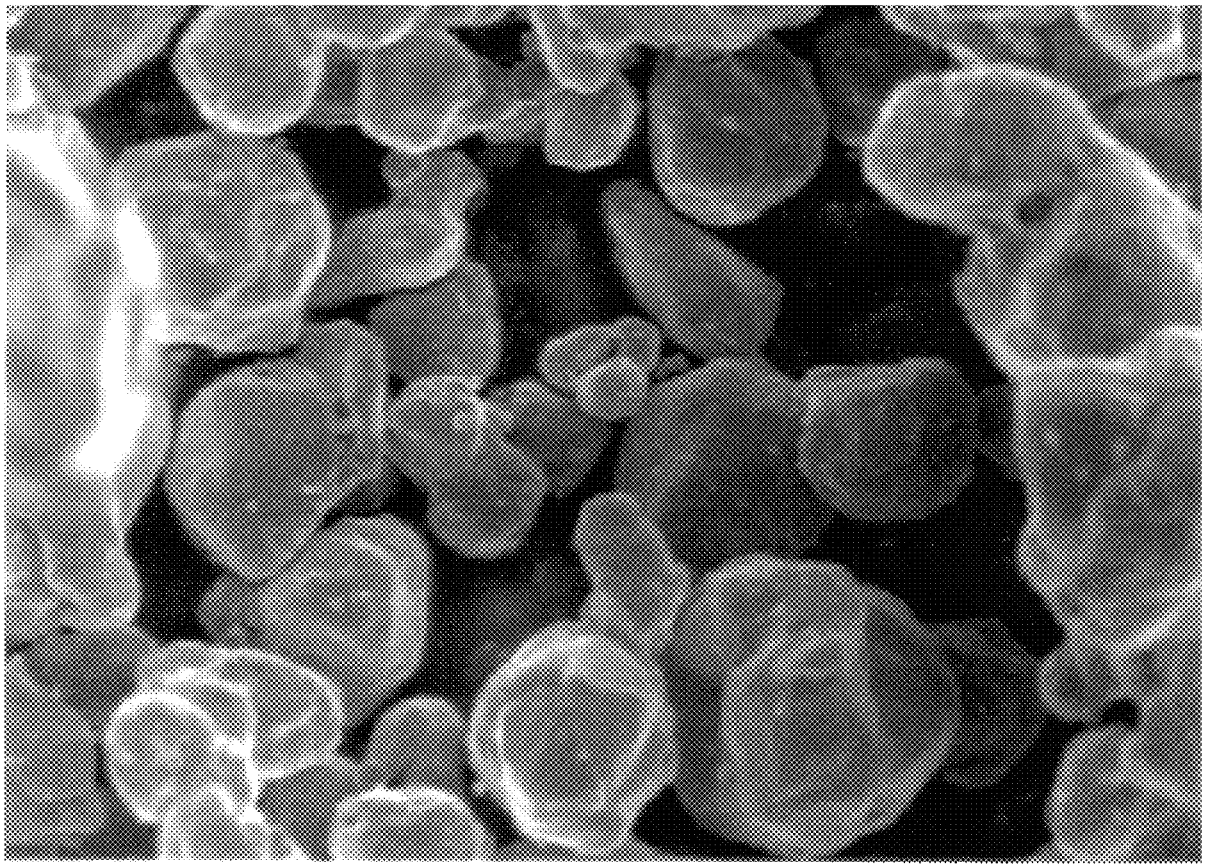

It has been empirically revealed that in accordance with the invention by variation of the parameters of the thermal decomposition it is possible to control efficiently the morphology and size of the powder. As best seen in FIGS. 11a,b,c particles of various size and shape can be obtained by thermal decomposition of the same compound depending on particular temperature of the process. FIG. 11a refers to Co powder received after thermal decomposition at 735° C. according to procedure described in example 3. FIG. 12b refers to the same Co powder received after thermal decomposition at 670° C. and FIG. 12c refers to 630° C.

Furthermore it has been empirically established that by applying vibration to the reactor it is possible to control the agglomeration state and to prevent formation of agglomerates during the powder formation. With reference to FIG. 12a,b one can see the agglomerated and non-agglomerated Co powder formed respectively without and with applying mechanical vibrations during thermal decomposition of Co(NH$_4$)$_2$F$_4$ as described in Example 1. It can be readily appreciated that non-agglomerated metal powder having irregular particles shape has improved tap density, thus better fills a die during the compacting stage and therefore enables producing green bodies with improved strength.

It should be appreciated that the present invention is not limited to the above described embodiments and that changes and modifications can be made by one ordinarily skilled in the art without deviation from the scope of the invention, as will be defined in the appended claims.

It should be appreciated that the features disclosed in the foregoing description, and/or in the following claims, and/or in the accompanying drawings, and/or in the accompanying examples may both separately, and in any combination thereof, be material for realizing the present invention in diverse forms thereof.

What is claimed is:

1. A process for manufacturing a metal powder from a halogen containing compound of said metal comprising the steps of:
    decomposing said compound and producing a metal halide and a reducing agent;
    reducing said metal halide to elemental metal using said reducing agent; and
    collecting said elemental metal form of powder;
    wherein said decomposition step is carried out by a thermal treatment in a stationary, non-oxidizing atmosphere.

2. The process of claim 1, wherein said metal is selected from the group consisting of elements taken from Group IVb, Vb, VIb, VIIb, VIIIb, Ib, and IIb of the Periodic System.

3. The process of claim 2, wherein said halogen containing compound comprises nitrogen and hydrogen.

4. The process of claim 3, wherein said halogen containing compound comprises metal ammonium halide, metal amine halide or metal hydrazine halide.

5. The process of claim 4, wherein said reducing agent is hydrogen.

6. The process of claim 1, wherein said thermal treatment is carried out under conditions of thermodynamic equilibrium at a temperature above which said reducing agent reduces said metal halide to elemental metal.

7. The process of claim 1, wherein said metal is Co, Ni or Cu and said chemical compound is selected from the group consisting of metal ammonium fluoride, metal amine chloride and metal hydrazine chloride.

8. The process of claim 1, wherein said thermal treatment is carried out in a closed reactor.

9. The process of claim 8, further comprising the step of applying vibration to said closed reactor.

10. The process of claim 8, further comprising the step of cooling said powder.

11. The process of claim 10, wherein said step of cooling said powder is carried out in the stationary, initially non-oxidizing atmosphere.

12. The process of claim 7, wherein said chemical compound is (NH$_4$)$_2$CoF$_4$ and said thermal treatment is carried out under a nitrogen atmosphere at a temperature of about 550–750° C. and under a pressure of not more than 5 atm.

13. The process of claim 7, wherein said chemical compound is (NH$_4$)$_2$CoF$_3$ and said thermal treatment is carried out under a nitrogen atmosphere at a temperature of about 600–750° C. and under a pressure of not more than 5 atm.

14. The process of claim 7, wherein said chemical compound is (Co(NH$_3$)$_6$Cl)Cl$_2$ and said thermal treatment is carried out under a nitrogen atmosphere at a temperature of about 600–750° C. and at a pressure of not more than 7 atm.

15. The process of claim 7, wherein said chemical compound is (NH$_4$)$_2$ NiF$_4$ and said thermal treatment is carried out under a nitrogen atmosphere at a temperature of about 370–530° C. and at a pressure of not more than 5 atm.

16. The process of claim 7, wherein said chemical compound is (NH$_4$)$_2$CuF$_4$ and said thermal treatment is carried out under a nitrogen atmosphere at a temperature of about 270–400° C. and at a pressure of not more than 2 atm.

* * * * *

UNITED STATES PATENT AND TRADEMARK OFFICE
CERTIFICATE OF CORRECTION

PATENT NO. : 6,090,179
DATED : July 18, 2000
INVENTOR(S) : Rosenband et al

It is certified that error appears in the above-identified patent and that said Letters Patent is hereby corrected as shown below:

On the title page: Item [54] and Column 1, line 3,
"POWER" should read --POWDER--.

Item [75] Inventors: "Valory" should read -- Valery--.

Signed and Sealed this

Ninth Day of January, 2001

*Attest:*

Q. TODD DICKINSON

*Attesting Officer*  *Commissioner of Patents and Trademarks*